United States Patent [19]

Iijima

[11] Patent Number: 5,035,051
[45] Date of Patent: Jul. 30, 1991

[54] METHOD OF MANUFACTURING A BEARING BUSH

[75] Inventor: Yoshio Iijima, Nagoya, Japan

[73] Assignee: Daido Metal Company Ltd., Nagoya, Japan

[21] Appl. No.: 423,532

[22] Filed: Oct. 16, 1989

Related U.S. Application Data

[63] Continuation of Ser. No. 738,366, May 28, 1985, abandoned.

[30] Foreign Application Priority Data

Jul. 13, 1984 [JP] Japan .................... 59-145855

[51] Int. Cl.[5] .................... B21K 1/04; F16C 33/02
[52] U.S. Cl. .................... 29/898.054; 29/898.058; 384/276
[58] Field of Search ............ 29/898, 898.04, 898.041, 29/898.054, 898.056, 898.057, 898.058, 898.059; 384/276

[56] References Cited

U.S. PATENT DOCUMENTS

| 1,454,682 | 5/1923 | Layne | 384/292 |
|---|---|---|---|
| 1,794,184 | 2/1931 | Leis | 29/149.5 C |
| 1,913,204 | 6/1933 | Larzelere | 29/898.054 X |
| 1,922,304 | 8/1933 | Klocke | 29/898.054 X |
| 1,976,485 | 10/1934 | Dieter | 384/425 X |
| 2,124,132 | 7/1938 | Bate et al. | 29/898.058 |
| 2,449,662 | 9/1948 | Leeson | 29/898.054 X |
| 2,671,702 | 3/1954 | Meadows | 384/240 |
| 3,241,336 | 3/1966 | Nemtsov | 464/132 X |
| 3,361,502 | 1/1968 | Weinkamer et al. | 384/294 |
| 4,437,214 | 3/1984 | Olschewski et al. | 29/149.5 DP |
| 4,514,098 | 4/1985 | Ippolito | 384/95 |

FOREIGN PATENT DOCUMENTS

| 3017452 | 11/1981 | Fed. Rep. of Germany | 384/283 |
|---|---|---|---|
| 563142 | 5/1957 | Italy | 384/425 |
| 576664 | 5/1958 | Italy | 384/276 |
| 17410 | 10/1962 | Japan | 384/276 |
| 29812 | 2/1982 | Japan | 384/276 |
| 740363 | 6/1980 | U.S.S.R. | 29/898.054 |
| 1438327 | 6/1976 | United Kingdom | 384/276 |

*Primary Examiner*—Thomas R. Hannon
*Attorney, Agent, or Firm*—Browdy and Neimark

[57] ABSTRACT

A bearing bush includes a cylindrical portion for bearing a radial load on a rotating shaft, and a flange formed integral with the cylindrical portion and adapted to bear a thrust load on the rotating shaft. The flange has a through hole at its center. Accordingly, it is not necessary for the rotating shaft born by the bearing bush to be formed with a step. The rotating shaft can therefore be reduced in its diameter.

7 Claims, 2 Drawing Sheets

METHOD OF MANUFACTURING A BEARING BUSH

This application is a continuation of application Ser. No. 06/738,366 filed May 28, 1985, now abandoned.

BACKGROUND OF THE INVENTION

The present invention relates to a bearing bush and a method of manufacturing the same, which bearing bush has a seam and is of an integral structure suitable for use in, for example, a turntable in a microwave oven for the purpose of bearing a thrust load as well as a radial load.

For example, U.S. Pat. No. 4,437,214 discloses a method of manufacturing a bearing bush which is unitary and is not provided with any seam and which has an inwardly extending flange without any seam. This prior bearing bush is formed only by drawing.

As seen from FIGS. 1–7 of the above patent, an annular groove (2) is formed in a unitary circular plate to facilitate manufacture, and the circular plate is subjected to drawing by means of a die (7) and a punch (8) in a similar manner to the manufacture of pots. As shown in FIG. 4 of the patent, the bottom is partly punched by a punch (15). However, such method is disadvantageous for the manufacture of a multi-layered bearing in that an inner peripheral layer of a soft bearing alloy and an outer peripheral layer of a hard steel back layer will become separated from each other at the interface therebetween to cause cracking in the bearing alloy, thus resulting in reduction in accuracy of surface working and out of roundness and misalignment of a bearing bush and a rotating shaft. Accordingly, finished multi-layered products according to the patent are unsatisfactory.

SUMMARY OF THE INVENTION

It is a primary object of the present invention to provide a bearing bush which has eliminated the above-described disadvantages of prior bearing bushes.

To this end, the present invention provides a multi-layered seamed bearing bush comprising a cylindrical portion for bearing a radial load on a rotating shaft, and an inward flange having a bore and formed integral with the cylindrical portion to bear a thrust load on the rotating shaft.

The above and other advantages, features and advantages of the present invention will become clear from the following description of the preferred embodiments thereof, taken in conjunction with the accompanying drawings.

DESCRIPTION OF THE PREFERRED EMBODIMENTS

Figure 1:
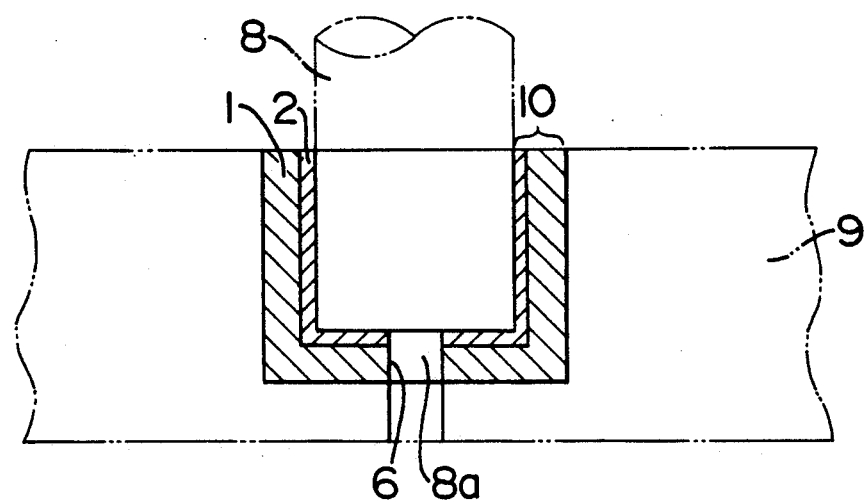
FIG. 1 shows an axial cross section of a bearing bush in accordance with a first embodiment of the present invention in the state wherein the bearing bush is incorporated in a bearing housing for a turntable of a microwave oven.
Figure 2:
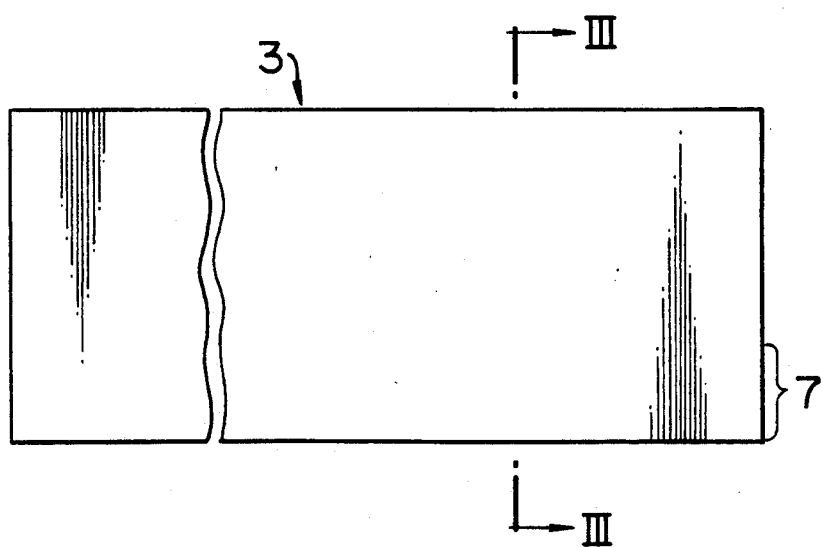
FIG. 2 is a plan view of a blank employed to form the bearing bush shown in FIG. 1.
Figure 3:
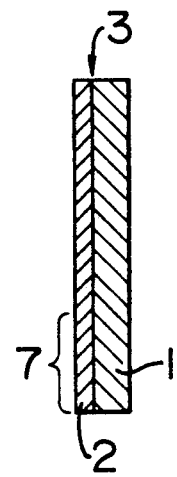
FIG. 3 is a sectional view taken along the line III—III of FIG. 2.

Referring first to FIG. 1, there is shown a bearing bush 10 for bearing a thrust load as well as a radial load in accordance with a first embodiment of the present invention. The bearing bush 10 is formed from a single bimetal-shaped metal sheet 3 which is constituted by two layers, that is, a steel back layer 1 and a bearing alloy layer 2 as shown in FIGS. 2 and 3. The metal sheet 3 is rolled up into a cylindrical shape, and the lower end portion 7 of the cylindrical metal sheet 3 is subject to drawing such that it is formed into a generally cup-shaped bearing bush 10 of an integral structure for bearing a thrust load as well as a radial load, such as that shown in FIG. 1. Accordingly, the bearing bush 10 has a seam (not shown) and a shape in the axial cross section which is defined by an L-shaped portion and a backward L-shaped portion which face each other, as shown in FIG. 1.

Figure 4:
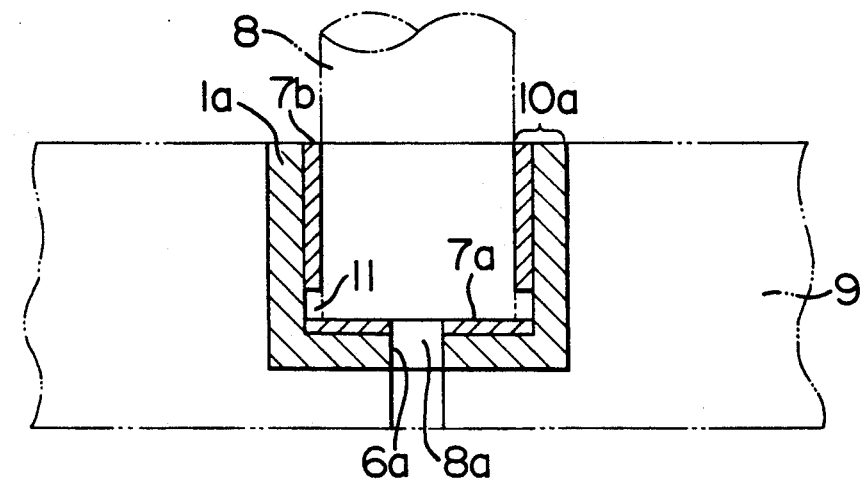
FIG. 4 is a sectional view similar to FIG. 1 and showing a bearing bush in accordance with a second embodiment of the present invention.
Figure 5:
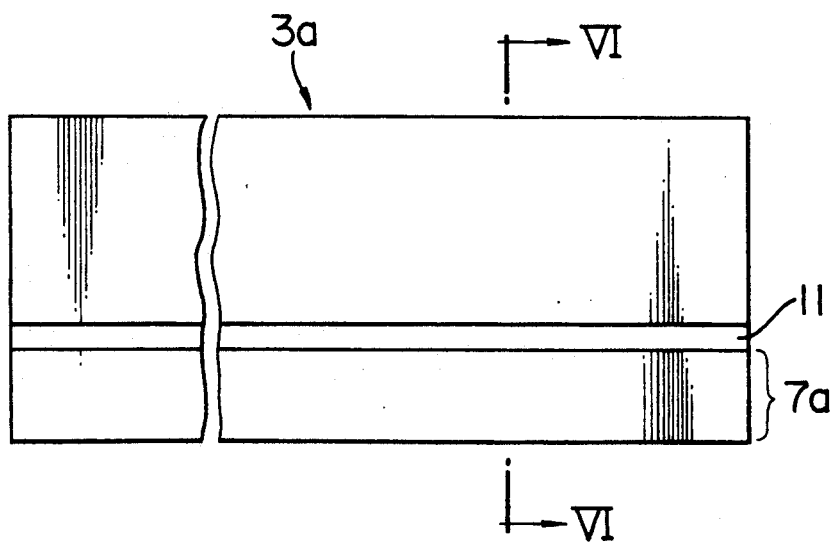
FIG. 5 is a plan view of a blank employed to form the bearing bush shown in FIG. 4.
Figure 6:
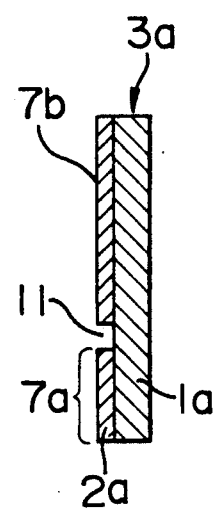
FIG. 6 is a sectional view taken along the line VI—VI of FIG. 5.

Referring next to FIG. 4, there is shown a bearing bush 10a for bearing a thrust load as well as a radial load in accordance with a second embodiment of the present invention. This bearing bush 10a is formed from a bi-metal-shaped metal sheet 3a such as that shown in FIGS. 5 and 6. The metal sheet 3a is constituted by two layers, that is, a steel back layer 1a and a bearing alloy layer 2a. The bearing alloy layer 2a is divided into a lower end portion 7a and an upper portion 7b by a groove or notch 11, which extends laterally of the metal sheet 3a. The metal sheet 3a is rolled up into a cylindrical shape in such a manner that the notch 11 is located inside the cylinder, and at the same time, the lower end portion 7a of the bearing alloy layer 2a and the lower end portion of the steel back layer 1a are subjected to drawing, thereby providing the bearing bush 10a of an integral structure and with a bore 6a formed in its center. Accordingly, this bearing bush 10a has a seam (not shown) and a shape in the axial cross section which is defined by an L-shaped portion and a backward L-shaped portion which face each other, such as that shown in FIG. 4.

In the above-described embodiments, blanks employed to form the bearing bushes include single materials, composite materials or multi-layered materials which are obtained by subjecting the surfaces of these materials to overlay plating. These blanks should be high in mechanical strength and excellent in surface properties. More specifically, it is preferable to employ a blank which is excellent in the resistance to deformation under load, drapeability, low-frictional properties, wear resistance, fatigue resistance, non-seizure, the anti-corrosion and thermal conduction.

The present invention offers the following advantages.

(1) In contrast to a prior method of manufacturing a bearing bush (with inward extending flange) only by means of drawing, which bearing bush has no seam or joint, the present invention provides a method of manufacturing a bearing bush having a seam and an inward extending flange. In the present invention, the wrapping of a bimetal is combined with drawing to eliminate cracking of the alloy layer, separation and misalignment.

(2) A bearing bush and a method of the same, according to the present invention, are superior to those of a prior art (the above patent), in particular, in regards to out-of-roundness of a bearing bush.

(3) In the case where the bearing bush has a notch formed in the lower end portion of its inner peripheral wall, the notch advantageously serves as a relief which receives wear dust produced as the result of wearing of an alloy for sliding purposes, for example, a bearing alloy, during the rotation of the rotating shaft, thereby ensuring a smooth rotational operation of the rotating shaft. Further, since for the bore 6 formed in the bottom of the bearing bush can be used for removing the wear dust produced as the result of the rotational operation of the rotating shaft as well as for feeding oil, it is therefore possible to prevent the wear dust from damaging the rotating shaft, the thrust and radial load bearing surfaces of the bearing bush and also prevent seizure.

(4) The central bore (6a) can be formed only by drawing unlike in the above patent, in which the bottom of a bearing bush is punched by a punch (15) to form a bore. Accordingly, the present method involves less procedures of manufacture to reduce cost.

Although the invention has been described through specific terms, it is to be noted here that the described embodiments are not exclusive and various changes and modifications may be imparted thereto without departing from the scope of the invention which is limited solely by the appended claims.

What is claimed is:

1. A method of manufacturing a bearing bush having a seam, comprising the steps of:
   (a) providing a metallic plate (3a) having a steel back layer (1a) and a bearing alloy layer (2a);
   (b) forming a wear dust receiving annular groove (11) in said bearing alloy layer (2a);
   (c) wrapping said metallic plate into a cylindrical shape with said annular groove (11) facing inward; and
   (d) drawing lower end portions of said bearing alloy layer (2a) and said steel back layer (1a) to thereby form a central bore (6a).

2. A method according to claim 1 wherein said steps (b)–(d) are carried out so that the resultant bearing bush has said wear dust receiving annular groove extending substantially entirely parallel to a bottom wall of said bearing bush formed during said drawing step.

3. A method according to claim 1 wherein, in said providing step, said metallic plate is provided with an overlay plating on said bearing layer.

4. A method according to claim 1 wherein, in said providing step, said bearing alloy layer is formed of non-ferrous alloy.

5. A method according to claim 1 wherein, in said forming step, said wear dust receiving annular groove is formed with a rectangular cross section.

6. A method according to claim 1 wherein, in said forming step, said annular groove is made to extend entirely through said bearing layer, exposing the surface of said back layer.

7. A method according to claim 1 wherein, following said wrapping step, a seam is created to form a cylinder with a seam.

* * * * *